(12) United States Patent
Nagy

(10) Patent No.: US 8,619,970 B2
(45) Date of Patent: Dec. 31, 2013

(54) ECHO CANCELLERS AND ECHO CANCELLING METHODS

(75) Inventor: Ferenc Nagy, Albuquerque, NM (US)

(73) Assignee: Lectrosonics, Inc., Rio Rancho, NM (US)

(*) Notice: Subject to any disclaimer, the term of this patent is extended or adjusted under 35 U.S.C. 154(b) by 754 days.

(21) Appl. No.: 12/816,593

(22) Filed: Jun. 16, 2010

(65) Prior Publication Data

US 2011/0311066 A1  Dec. 22, 2011

(51) Int. Cl.
*H04M 9/08* (2006.01)
(52) U.S. Cl.
USPC .................................. 379/406.08
(58) Field of Classification Search
USPC .................................. 379/406.08
See application file for complete search history.

(56) References Cited

U.S. PATENT DOCUMENTS

2006/0140393 A1* 6/2006 Laberteaux ............... 379/406.01

OTHER PUBLICATIONS

Dongning Guo, Mutual Information and Minimum Mean-Square-Error in Gaussian Channels, Apr. 2005, IEEE Transactions on Information Theory, vol. 51 No. 4.*
Fujii et al., A Double Talk Control Method Improving Estimation Speed by Adjusting Required Error Level, 2011 Joint Workshop on Hands-free Speech Communication and Microphone Arrays, May 30-Jun. 1, 2011, pp. 170-175, IEEE.
Gunale et al., Frequency Domain Adaptive Filter using FFT Algorithm for Acoustic Echo Cancellation, Third International Conference on Emerging Trends in Engineering and Technology, Nov. 19-21, 2010, pp. 582-587, IEEE.
Paleologu et al, A Class of Double-Talk Detectors Cased on the Holder Inequality, 2011 IEEE International Conference on Acoustic, Speech and Signal Processing (ICASSP), May 22-27, 2011, pp. 425-428, IEEE.
DeBrunner et al., "Hirschman Optimal Transform DFT Block LMS Algorithm", IEEE, pp. 3806-3808 (2008).
Alkhouli et al., "Convergence Analysis of Hirschman Optimal Transform (HOT) LMS Adaptive Filter", IEEE, pp. 126-130 (2007).
Krishna et al., "Acoustic Echo Cancellation using a Computationally Efficient Transform Domain LMS Adaptive Filter", IEEE, pp. 409-412 (2010).
Przebinda et al., "The Optimal Transform for the Discrete Hirschman Uncertainty Principle", IEEE, vol. 47, No. 5, pp. 2086-2090 (Jul. 2001).
Dembo et al., "Information Theoretic Inequalities", IEEE, vol. 37, No. 6, pp. 1501-1518 (Nov. 1991).

* cited by examiner

*Primary Examiner* — Alexander Jamal
(74) *Attorney, Agent, or Firm* — The Law Office of Michael E. Kondoudis

(57) ABSTRACT

Methods and systems for updating the adaptive filter of an echo canceller. A method of updating the adaptive filter of an echo canceller in which an estimated echo is resolved from a received signal and then subtracted from an incoming echo-contaminated signal so as to produce a filtered output signal, includes: obtaining a corrected impulse response of an echo reconstruction filter (ERF); calculating specified decision measures usable to decide whether to prospectively apply the corrected ERF impulse response or a current ERF impulse response; determining whether application of the corrected ERF impulse response would result in improved echo cancellation; and updating the ERF to apply the corrected impulse response, when it is determined that the updating would result in a lower residual echo.

11 Claims, 4 Drawing Sheets

400

```
┌─────────────────────────────────┐
│ Applying an adaptive filter to  │
│     echo-contaminated signal    │
│                                 │
│                            410  │
└─────────────────────────────────┘
                 │
┌─────────────────────────────────┐
│ Maintain record of past performance │
│                                 │
│                            420  │
└─────────────────────────────────┘
                 │
┌─────────────────────────────────┐
│ Determine a potential corrected ERF │
│             (ERFc)              │
│                            430  │
└─────────────────────────────────┘
                 │
┌─────────────────────────────────┐
│    Decide if ERFc would result  │
│       in improved performance   │
│                            440  │
└─────────────────────────────────┘
                 │
┌─────────────────────────────────┐
│  Replace current ERF with ERFc when │
│  ERFc would have resulted in improved │
│            performance          │
│                            450  │
└─────────────────────────────────┘
                 │
┌─────────────────────────────────┐
│   Subtract estimated echo (Ee)  │
│      from input signal (Y)      │
│                            460  │
└─────────────────────────────────┘
```

FIG. 4

ECHO CANCELLERS AND ECHO CANCELLING METHODS

BACKGROUND

1. Technical Field

Embodiments of the present invention relate generally to echo cancellation and, more particularly, to acoustic echo cancellation using an adaptive filter.

2. Description of Related Art

Echo cancellation is an example of signal filtering in which selected, undesired components of a signal are removed. In echo cancellation, echo is removed from an acoustic, echo-contaminated signal in order to improve signal quality. Generally, echo cancellers resolve an estimate of the echo in an echo-contaminated signal and then subtract that estimate from the signal. A known way to make this estimate is with a signal filtering algorithm.

Echo cancellation is an example of adaptive signal filtering and echo cancellers are adaptive filters. Adaptive filters apply algorithms with adjustable coefficients that change in response to changing signal conditions. Adaptive filters, as their name implies, are capable of learning which components of a signal are unwanted, during normal operation and without training. This ability to change offers autonomous adaptability (i.e., the ability to automatically adjust to an unknown environment), which tends to yield more accurate estimates of an echo in applications in which a necessary frequency response may not be known beforehand or may vary with time. Examples of such applications include telecommunications, control systems, and radar systems.

There are known challenges in acoustic echo cancellation, most of which may be categorized as relating to the time variability of signals and the echo signal path. In many applications, the reference and local echo-contaminated signals have natural variations, and a speaker on either side of a conversation, for example, may start and stop talking at any time. These factors cause the statistical properties of the reference and local signals to change quickly and to have a high dynamic range. This is why assumptions that the involved signals are stationary or even slowly changing lead to inferior performance.

In addition, sampling rates can pose a challenge. For example, it is known that in order to get reliable frequency or impulse response estimates in the presence of noise, an average of a significant number of modified estimates of the spectral density of a signal (periodograms) is required. And, an insufficient number of estimates in a given interval increases the likelihood that even significant signal variations may not be registered. This results in echo canceller performance that is effectively determined by the average echo-to-noise ratio (ENR) of the echo-contaminated signal, which is usually significantly lower than its peak.

Approaches to resolve these known problems include using unique methods to detect double talk and changes in the acoustic path, or to control the adaptation gain. These approaches have not been entirely successful, however.

BRIEF SUMMARY

One aspect of the present invention provides a method of updating the adaptive filter of an echo canceller in which an estimated echo is resolved from a received signal and then subtracted from an incoming echo-contaminated signal so as to produce a filtered output signal, including: obtaining a corrected impulse response (hc) of an echo reconstruction filter (ERF); calculating specified decision measures usable to decide whether to prospectively apply the corrected ERF impulse response hc or a current ERF impulse response he to a reference signal (X), the decision measures being (i) a mutual information rate (infoVeX) of an estimate of the signal plus noise (Ve) and the reference signal (X), (ii) an estimated echo return loss enhancement (ERLEi) of the echo canceller, and (iii) a corrected echo return loss enhancement (ERLEc) of the echo canceller; determining whether application of the corrected ERF impulse response hc would result in improved echo cancellation by (i) comparing a mutual information rate of infoVeX to a specified threshold, and (ii) comparing the ERLEc to the ERLEi; and updating the ERF to apply the corrected impulse response hc, when it is determined that the updating would result in a lower residual echo (Er), based on a comparison of past performance of the ERF using the corrected impulse response hc and past performance of the ERF using the current ERF impulse response he.

Another aspect of the present invention provides a method of updating an echo reconstruction filter (ERF) having changeable coefficients, including: calculating a corrected impulse response (hc) of an echo reconstruction filter (ERF); calculating specified decision measures usable to decide whether to apply a current ERF or an updated ERF to echo-contaminated signals in the future; deciding, based on the calculated decision measures, whether the hc would have yielded a lower residual echo (Er) than the current impulse response of the ERF (he) when applied to past observations; and replacing the coefficients of the ERF so that an impulse response of the ERF (he) equals hc.

Still another aspect of the present invention provides an echo canceller that cancels an echo from an echo-contaminated signal, including: a logic section that applies an echo reconstruction filter (ERF) to a reference signal (X) to resolve an estimated echo (Ee), the ERF based on an adaptive filter with coefficients that are changeable based on a peak echo-to-noise ratio of the echo-contaminated signal, determines a corrected impulse response (hc) of an echo reconstruction filter (ERF); evaluates whether a corrected echo reconstruction filter (ERFc) with coefficients that cause an impulse response thereof to match hc would have resulted in a lower residual echo (Er) than those of the current ERF when applied to past observations, and replaces the coefficients so that the impulse response of the ERF (he) matches hc, when the hc would have resulted in a lower residual echo; and a subtractor that filters the echo from the echo-contaminated signal (Y) by subtracting the resolved Ee therefrom to produce a filtered output signal (Ve).

Yet another aspect of the present invention provides an echo cancelling method, including: applying, to an echo-contaminated signal, an adaptive filter with coefficients that are changeable based on a peak echo-to-noise ratio of the echo-contaminated signal; maintaining at least a partial record of echo cancellation performance of the applying; determining a corrected echo reconstruction filter (ERFc); deciding whether the ERFc will result in improved echo cancellation, based on comparisons of echo return loss enhancement (ERLE) of past echo canceller performance using a current ERF and the ERFc; replacing the ERF with the ERFc when the ERFc would have resulted in a lower residual echo Er than the ERF; and subtracting an estimated echo (Ee) resolved by the ERF from future incoming echo-contaminated signals.

These additional, and/or other aspects and/or advantages of the present invention are: set forth in the detailed description which follows; possibly inferable from the detailed description; and/or learnable by practice of the present invention.

BRIEF DESCRIPTION OF THE DRAWINGS

The present invention will be more readily understood from the detailed description of embodiments thereof made in conjunction with the accompanying drawings of which:

FIG. 4 is a flowchart of an echo cancelling method consistent with an embodiment of the present invention.

DETAILED DESCRIPTION OF THE PRESENT INVENTION

Figure 1:
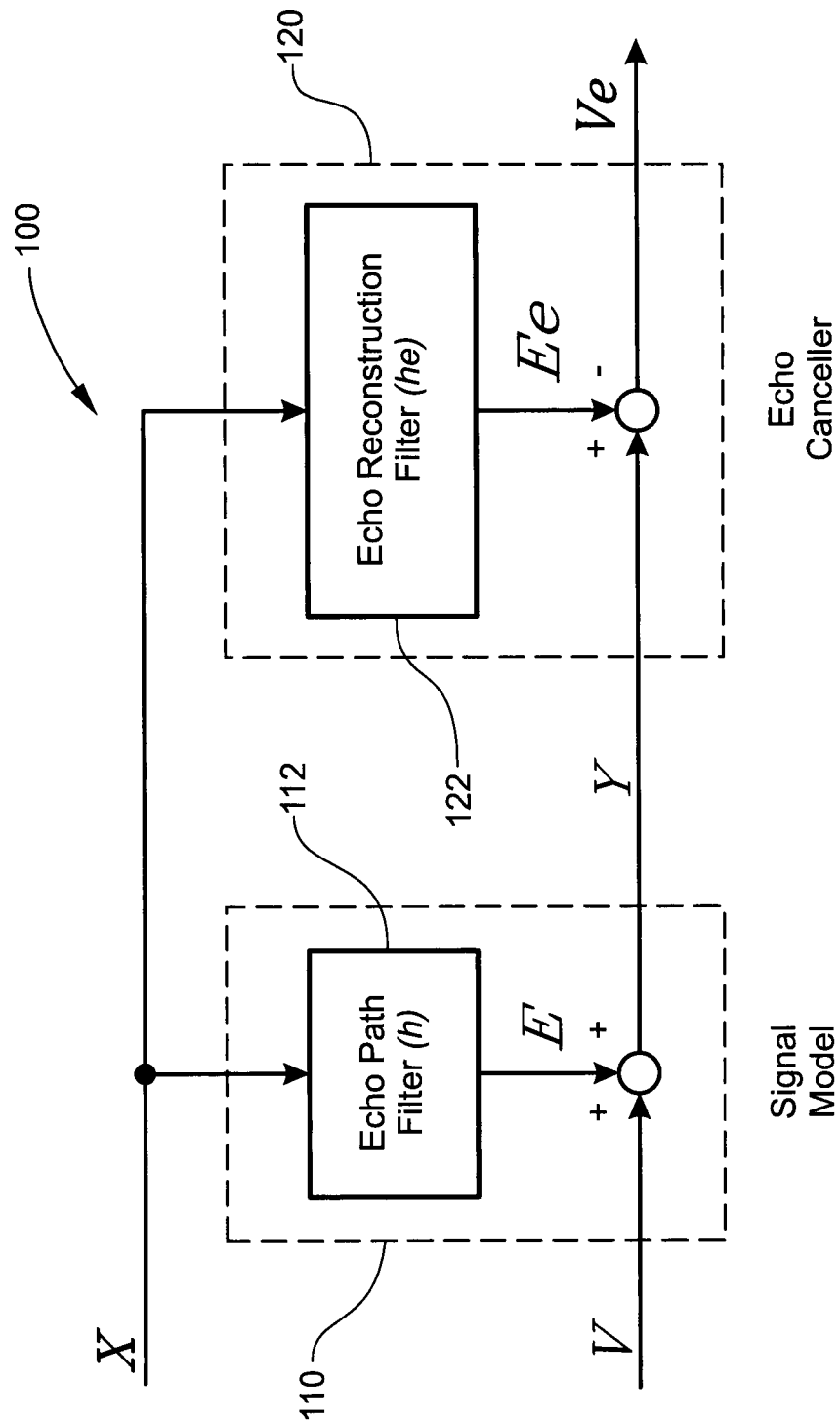
FIG. 1. is a schematic view of conventional echo cancelling system.

Reference will now be made in detail to one or more embodiments of the present invention, examples of which are illustrated in the accompanying drawings, wherein like reference numerals refer to the like elements throughout. The one or more embodiments are described below to explain the present invention by referring to the figures.

Referring now to FIG. 1, there is schematically illustrated a conventional echo cancellation system 100. The system 100 comprises a signal model 110 and an echo canceller 120. The signal model 110 includes an echo path filter (EPF) 112 with an impulse response (h) and a frequency response given by the following:

$$H(f) = \sum_{n=0}^{L-1} h_n e^{2\pi i f n} \qquad \text{Equation (1)}$$

The echo canceller 120 includes an echo reconstruction filter (ERF) 122 with an impulse response (he) and a frequency response given by the following:

$$He(f) = \sum_{n=-\infty}^{\infty} he_n e^{2\pi i f n}. \qquad \text{Equation (2)}$$

The impulse response he is an estimate of h.

In operation, reference signal X is received by both the signal model 110 and the echo canceller 120. The EPF 112 outputs an echo component $E_n$ that is computed with an adaptation algorithm. The ERF outputs an estimated echo signal $Ee_n$ that is computed by an adaptive filtering algorithm. Both of these outputs are based on the input signal X. The echo component $E_n$ is given by the following:

$$E_n = (X*h)_n = \sum_{k=0}^{L-1} X_{n-k} h_k \qquad \text{Equation (3)}$$

The estimated echo component $Ee_n$ is given by the following:

$$Ee_n = (X*he)_n = \sum_{k=0}^{L-1} X_{n-k} he_k. \qquad \text{Equation (4)}$$

The signal model adds (introduces) the echo component $E_n$ to a local signal (V), to yield an echo-contaminated signal Y, given by:

$$Y=V+E. \qquad \text{Equation (5)}$$

Then, in the echo canceller 120, the estimated echo signal Ee from the ERF 120 is subtracted from the echo-contaminated signal Y, yielding a filtered output signal Ve in which the echo is effectively cancelled. Here, because the subtracted quantity Ee is an estimate, some residual echo may be present in output signal Ve. This residual echo (Er) is given by the following:

$$Er=E-Ee. \qquad \text{Equation (6)}$$

Signal Z then is resolved by the following:

$$Ve=Y-Ee \qquad \text{Equation (7)}$$

$$Y-Ee=V+E-Ec \qquad \text{Equation (8)}$$

$$V+E-Ec=V+Er \qquad \text{Equation (9)}$$

As the foregoing explanation suggests, there is often some residual echo-contamination in the output signal (Ve), because the echo cancellation is based on estimates of the echo contamination. Consequently, there is a residual (not cancelled) component hr of the impulse response h of the EPF h, which is given by:

$$hr=h-he, \qquad \text{Equation (10)}$$

and a residual (not cancelled) component Hr of the frequency response H of the ERF, $$Hr = H - He = \sum_{n=0}^{L-1} hr_n e^{2\pi i f n}. \qquad \text{Equation (5)}$$

Figure 2:
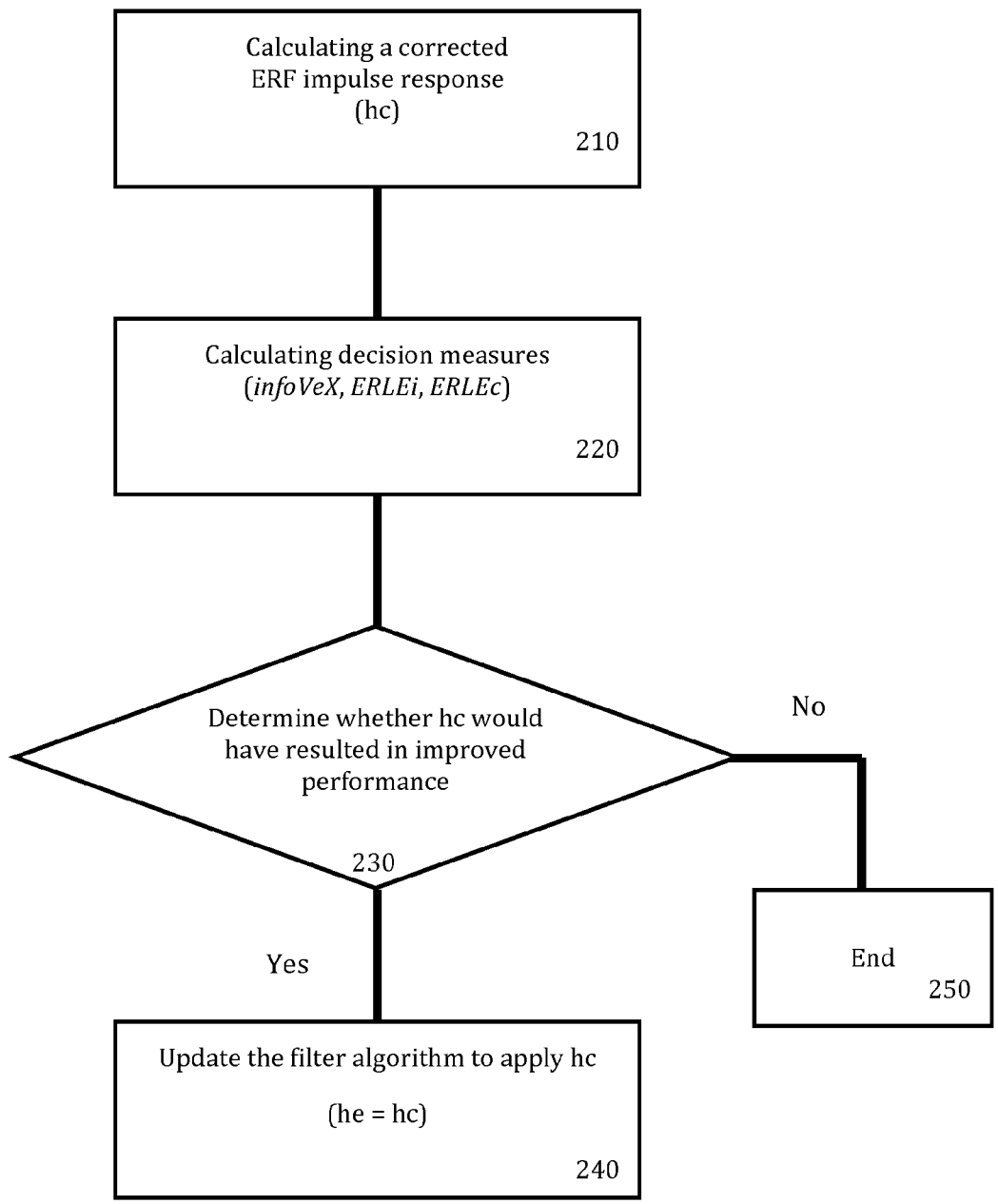
FIG. 2. is a flowchart of a method of updating the adaptive filter of an echo canceller consistent with an embodiment of the present invention.

Referring now to FIG. 2, there is shown a flowchart of a method 200 of updating an Echo Reconstruction filter (ERF) consistent with an embodiment of the present invention. For ease of explanation and to facilitate a better understanding of the method 200, the method 200 is described below with concurrent reference to FIG. 1. It is to be understood, however, that the method 200 may be practiced with other systems.

The method 200 includes the following operations: calculating a corrected impulse response hc of an echo reconstruction filter (ERF) (operation 210); calculating specified decision measures usable to determine whether to modify/update the coefficients of an echo reconstruction filter (operation 220); determining whether application of the corrected ERF impulse response hc to the ERF would have yielded better echo cancellation than the currently active ERF impulse response he (i.e., whether hc would have resulted in improved performance) (operation 230); modifying/updating the coefficients of the ERF so that the impulse response of the ERF (he) matches the hc, when it is determined that the corrected ERF impulse response hc would have yielded improved echo cancellation (operation 240); and when it is determined that application of the corrected ERF impulse response hc would not have yielded improved echo cancellation the method 200 ends (operation 250).

Initially, the ERF update method 200 has two state variables: (1) the ERF impulse response estimate array he; and (2) the echo return loss enhancement variable (ERLEe). Both of these state variables are initialized to zero. After some iteration they will be non-zero but the echo cancellation is never total (100%), because it relies on estimates and signal characteristics that are in constant flux. So, adaptation is required in which the ERF is periodically updated (i.e., the coefficients of the filtering algorithm of the ERF are changed) in order to keep improving the echo cancellation and to follow the changes in the acoustic coupling.

In operation 210, a corrected ERF impulse response (hc) is calculated. In more detail, using a record of the reference signal X and the current ERF impulse response he, a record of the estimated echo Ee from the ERF may be calculated. Here, a fast convolution algorithm may be used. Also, depending on various factors such as record length and available memory, for example, this can be done using a single segment or multiple segments. When multiple segments are used, an overlap-add and/or an overlap-save method can be used.

With a calculation of Ee, an estimate of the local signal plus noise $Ve_n$ may be resolved by subtracting the estimated echo $Ee_n$ from a record of the input signal $Y_n$.

As is known, the basic premise of frequency-domain adaptation is that the residual frequency response Hr can be determined when two quantities are known; the power spectral density (PSD) $S_X$ and the cross PSD $S_{Ve,X}$. When these two quantities are known, the residual component of the frequency response of the ERF (Hr) can be calculated by the following:

$$Hr(f) = \frac{S_{Ve,X}(f)}{S_X(f)}. \qquad \text{Equation (12)}$$

This calculation may be avoided, however, because the residual component of the frequency response Hr may be estimated with a record of Ve and X. This estimation requires estimates of $S_X$ and $S_{Ve,X}$. One particularly efficient way to make these spectral estimates is by Welch's method, which has been found to be computationally efficient.

The convergence rate and the depth of the final echo cancellation depend on the segment length, the overlapping ratio, and the window (tapering) function affect selected. It has been deduced that a segment length (N) of 8/3 L, where L is the tail length of the ERF in samples, a Hann window function (used to reduce "edge effect" of finite Fourier transformation, namely the spectral leakage) given by the following:

$$w_n = \frac{1}{2} - \frac{1}{2}\cos\frac{2\pi}{N}n, n = 0, 1, \ldots N-1, \qquad \text{Equation (13)}$$

and 50% overlapping ratio produces particularly effective results.

Based on the spectral estimates, the corrected ERF impulse response may be computed as follows:

$$hc = he + IFFT\left(\frac{\hat{S}_{Ve,X}}{\hat{S}_X}\right). \qquad \text{Equation (14)}$$

The window filter tapers the covariance functions. Consequently, the above deconvolution is approximate. And, since the ERF must be causal, the negative lag domain of the cross covariance of Ve and X is not used. One particularly effective way to improve the accuracy of the deconvolution (and thus increase the convergence rate of the echo canceller), is to start the segments of Ve by L/2 samples before the segments of X. This increases the usable lag domain by a factor of 2, but requires modification of equation 14.

Next, in operation 220, various performance measures are calculated so that a determination of whether the resolved, corrected ERF impulse response hc should be applied (i.e., whether the filtering algorithm of the ERF should be updated so that the ERF impulse response he matches the hc) can be made.

The selection of the correct measures avoids divergence of the echo canceller due to high noise level, low reference signal level, or double (simultaneous near and far side) talk, and enables the ERF to recognize when a change in the EPF occurs. Here, It is to be noted that the method 200 does not use the actual output of the echo canceller. Rather, a record of past observations is used. Stated another way, the method determines what would have happened to performance if the corrected ERF impulse response hc was applied in the past observation period. This can be advantageous because it increases the convergence rate without having to wait for the transient of the ERF to decay. Additionally, potential changes may be tested without actually applying to them the output of the echo canceller.

First, a record of the corrected echo Ec is resolved, using the same record of the reference signal X used for calculating Ee and hc. Here, optionally, the same fast convolution algorithm may be used. Then, the corrected estimate of the local signal plus noise Vc may be calculated by the following:

$$Vc_n = Y_n - Ec_n. \qquad \text{Equation (15)}$$

And, since Vc is a better estimate of V than Ve, the residual echo content Er in Ve may be estimated as follows:

$$Er_n = Ec_n - Ee_n. \qquad \text{Equation (16)}$$

With the above calculations and estimates, the following power spectral densities (PSDs) may be calculated: $\hat{S}_{Y,X}$, $\hat{S}_{Vc}$, and $\hat{S}_{Ve}$. Here, $\hat{S}_{Ve}$ may be calculated by the following:

$$\hat{S}_{Ve}(k) = \hat{S}_{Er}(k) + \hat{S}_{Vc}(k). \qquad \text{Equation (17)}$$

This, of course, first requires an estimate of $\hat{S}_{Er}$. Estimating the other PSDs can be done using the same method. Optionally and/or alternatively, since a record of Ve has been calculated, $\hat{S}_{Ve}$ may be directly calculated. This approach is not preferred because of the presence of a variance term, as explained below.

When the echo canceller is fully converged, the level of residual echo content Er of the echo canceller output is well below the level of the local noise and signal V. The amount of information from the reference signal left in the output of the echo canceller can be calculated using Shannon's mutual information rate as a measure. Pinsker has shown that when the random processes Ve and X are stationary joint Gaussian processes then their mutual information rate is the following in bits/sample:

$$I(Ve, X) = \frac{1}{2}\int_{-1/2}^{1/2} \log_2 \frac{S_{Ve}S_X}{S_{Ve}S_X - |S_{Ve,X}|^2} \qquad \text{Equation (18)}$$

This assumption, that signals are sample functions of Gaussian random processes, is common in statistical signal processing. This assumption, however, may be less accurate if only second order statistics are used. For this reason, Pinsker's formula gives the best approximation to the mutual information rate given the circumstances. Evaluating Pinsker's formula in the above form using spectrum estimators is not practical, however, because it may result in a negative information rate which is theoretically impossible. A better way of calculating the mutual information rate is derived as follows:

$$\begin{aligned}I(Ve, X) &= \frac{1}{2}\int_{-1/2}^{1/2} \log_2 \frac{S_{Ve}}{S_{Ve} - \frac{|S_{Ve,X}|^2}{S_X}} \\ &= \frac{1}{2}\int_{-1/2}^{1/2} \log_2 \frac{S_{Ve}}{S_{Ve} - |Hr|^2 S_X} \\ &= \frac{1}{2}\int_{-1/2}^{1/2} \log_2 \frac{S_{Ve}}{S_{Ve} - S_{Er}} \\ &= \frac{1}{2}\int_{-1/2}^{1/2} \log_2 \frac{S_{Ve}}{S_V}\end{aligned} \qquad \text{Equation (19)}$$

Since V is not known, we use its corrected estimate Vc and evaluate the following equation to estimate the mutual information rate of Ve and X:

$$\text{infoVeX} = \frac{1}{N}\sum_{k=0}^{N/2-1} \log_2 \frac{\hat{S}_{Ve}(k)}{\hat{S}_{Vc}(k)} \qquad \text{Equation (20)}$$

where N is the length of the Fast Fourier Transform (FFT) block. Here the summation is only performed for the first N/2 point in order to take advantage of the symmetry of the PSD functions.

If $\hat{S}_{Ve}$ is calculated as the sum of $\hat{S}_{Er}$ and $\hat{S}_{Vc}$, the Equation (20) becomes $$\begin{aligned}\text{infoVeX} &= \frac{1}{N}\sum_{k=0}^{N/2-1} \log_2 \frac{\hat{S}_{Vc}(k) + \hat{S}_{Er}(k)}{\hat{S}_{Vc}(k)} \\ &= \frac{1}{N}\sum_{k=0}^{N/2-1} \log_2\left(1 + \frac{\hat{S}_{Er}(k)}{\hat{S}_{Vc}(k)}\right).\end{aligned} \qquad \text{Equation (21)}$$

Since the auto-PSD estimates are non-negative, infoVeX will be non-negative as well. It is also more accurate because Er and Vc are highly uncorrelated thus $\hat{S}_{Vc}Er \approx 0$. If $\hat{S}_{Ve}$ is calculated directly using Ve we get $$\hat{S}_{Ve} = \hat{S}_{Er} + \hat{S}_{Vc,Ee} + \hat{S}_{Ve}. \qquad \text{Equation (22)}$$

In this case, the contribution of the term $\hat{S}_{Vc}Ee$ to the expected value of the left side is zero at the accuracy of the estimation but its variance is comparable to that of the other two. The indirect method eliminates this variance term, and is thus preferred over direct computation.

The other two measures that we use in decision making are both interrelated and related to performance. A common measure of echo canceller performance is echo return loss enhancement (ERLE), which may be defined as a difference of the entropy rate in the echo content of the input and the output signals of the echo canceller:

$$\text{ERLE} = H(E) - H(Er). \qquad \text{Equation (23)}$$

Stated another way, the ERLE is the attenuation of the echo signal as it passes through the send path of an echo canceller.

Kolmogorov has proved that the entropy rate of a stationary Gaussian random signal is given by the following:

$$\mathcal{H}(X) = \frac{1}{2}\log_2(2\pi e) + \frac{1}{2}\int_{-1/2}^{1/2} \log_2 S_X. \qquad \text{Equation (24)}$$

Thus, $$\text{ERLE} = \frac{1}{2}\int_{-1/2}^{1/2} \log_2 \frac{S_E}{S_{Er}} = \int_{-1/2}^{1/2} \log_2 \frac{|S_{Y,X}|}{|S_{Ve,X}|}. \qquad \text{Equation (25)}$$

Equation (25) is preferred here because it yields more accurate estimates than the first one. Thus, the following two ERLE measures are used:

$$\text{ERLEi} = \frac{2}{N}\sum_{k=0}^{N/2-1} \log_2 \frac{|\hat{S}_{Y,X}(k)|}{|\hat{S}_{Ve,X}(k)|} \qquad \text{Equation (26)}$$

$$\text{ERLEc} = \frac{2}{N}\sum_{k=0}^{N/2-1} \log_2 \frac{|\hat{S}_{Y,X}(k)|}{|\hat{S}_{Vc,X}(k)|}, \qquad \text{Equation (27)}$$

where ERLEi is the estimate of the ERLE using the currently active ERF impulse response he and where ERLEc is an estimate of what ERLE would be if we used the corrected ERF impulse response hc.

These measures yield several advantages: (1) these measures are theoretically well established and have been verified by many on diverse fields of science and engineering; and (2) averaging the log spectrum maximizes the effectiveness of the averaging since the relative variance (the variance of the log spectrum) is constant. This makes it possible to detect residual echo and changes in the EPF well below the noise floor using very short observations and very low (2 to 5) averaging numbers for the modified periodograms.

Next, in operation 230, it is determined whether the correction should be applied (i.e., whether the resolved, corrected EPF impulse response hc, if applied to the ERF, will result in an improved echo cancellation). To make this determination, comparisons of the decision measures obtained in operation 220 are made.

First, infoVeX is compared to a threshold value which is usually between 0.5 and 1 bits/sample depending the accuracy of the PSD estimates which is dependent on the number of averaged modified periodograms if Welch's method is used. If infoVeX is not greater then the threshold value, then it may be deduced that the echo canceller has at least partially converged and the method may proceed to the next decision.

Conversely, if infoVeX is greater then the threshold value, it may be deduced that the current ERF impulse response estimate he is not accurate. This could be because the echo canceller has not converged yet or the echo path filter has recently changed. Regardless of the reason, ERLEe is reset to ERLEi before advancing to the next decision.

Next, it is determined whether to use the current ERF impulse he or the corrected impulse response hc in the future. Here, if the ERLEc is greater then the ERLEe then the hc will result in a better echo cancellation than he (i.e., that a lower residual echo Er in output signal Ve will result). This is a statistical confidence statement since it is based on an estimation of finite accuracy). In this case, he and ERLEe are replaced with hc and ERLEc, respectively.

In operation 240, when it is determined that updating the ERF to apply the corrected impulse response hc would result in a lower residual echo Er, the hc is activated. That is to say that the coefficients of the ERF are replaced to yield the corrected impulse response hc.

Figure 3:
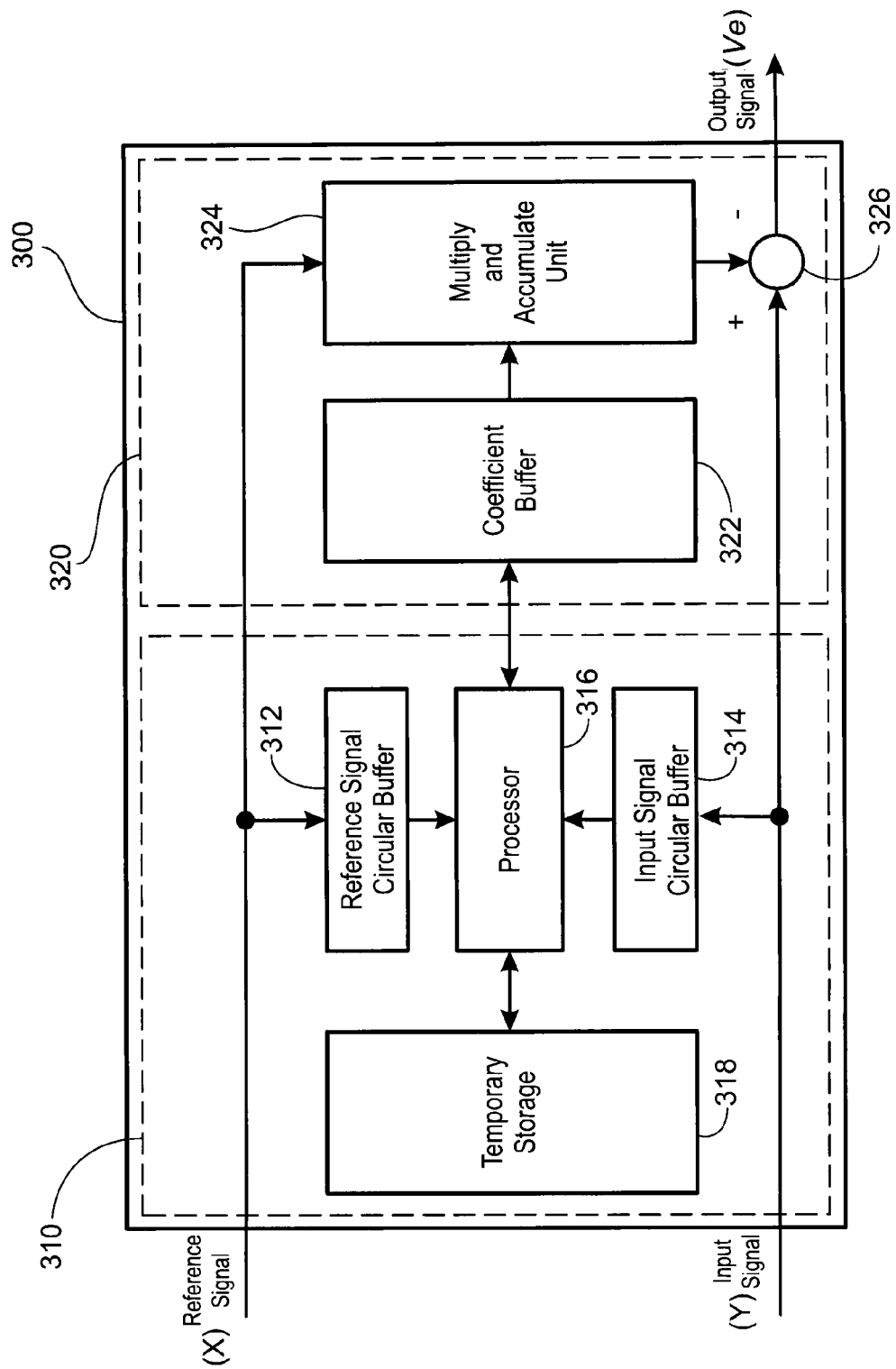
FIG. 3. is a schematic view of an echo canceller consistent with an embodiment of the present invention.

FIG. 3 shows the block diagram of an echo canceller 300 consistent with an embodiment of the present invention. Echo canceller 300 includes an adaptation processing section 310 and a signal flow processing section 320. These processing sections may be implemented using either the same processor or separate processors. Examples of the processors that may be used include either a general purpose fixed or floating-point DSP or an FPGA.

The adaptation processing section 310 implements the adaptation algorithm and provides the necessary coefficients for the filter algorithm of the signal flow processing section 320. The adaptation processing section 310 includes a reference signal circular buffer 312, an input signal circular buffer 314, a processor 316, and a memory 318. The two circular buffers 312 and 314 cooperate to make the echo canceller input signals' past history available to the processor 316 so that the processor may implement the adaptation algorithm and output coefficients to the signal flow processing section 320.

The processor 316 has the necessary computational capability and capacity to implement the adaptation algorithm. To this end, the processor 316 may be a processor with a floating-point arithmetic unit or a fixed-point processor that is configured to have enough storage to temporarily hold scalars and arrays used by the adaptation algorithm. Here, the memory 318 provides supplemental storage for the processor 316 in the event that the internal storage capacity of the processor 316 is exceeded.

The signal flow processing section 320 implements both the echo reconstruction filter (using the filter coefficients provided by the adaptation processor 310) and the subtractor. The signal flow processing section 320 includes a coefficient buffer 322, a multiply and accumulate unit 324; and a subtractor 326. The coefficient buffer 322 stores the current filter coefficients of the filtering algorithm. The multiply and accumulate unit 324 implements the echo reconstruction filter (ERF), which is a finite impulse response (FIR) filter. The subtractor 326 subtracts the estimated (or reconstructed) echo (Ee) from the input signal. The signal flow processing section is operated in real time and uses the current ERF impulse response.

Both processing sections 310 and 320 can take advantage of multiple cores and hardware accelerators since the algorithms can easily be broken down to parallel sections to estimate, for example, the PSDs, ERLEi and ERLEc.

Referring now to FIG. 4, there is illustrated an echo cancelling method 400 consistent with an embodiment of the present invention. The method 400 includes the following operations: applying, to an echo-contaminated signal, an adaptive filter with coefficients that are changeable based on a peak echo-to-noise ratio of the echo-contaminated signal (operation 410); maintaining at least a partial record of echo cancellation performance of the applying operation (operation 420) determining a potential corrected echo reconstruction filter (ERFc) (operation 430); deciding whether the ERFc will result in improved echo cancellation, based on comparisons of echo return loss enhancement (ERLE) of past echo canceller performance using a current ERF and the ERFc (operation 440); replacing the ERF with the ERFc when the ERFc would have resulted in a lower residual echo Er than the ERF (operation 450); and subtracting an estimated echo Ee resolved by the ERF from future incoming echo-contaminated signals (operation 460).

In method 400, the determining of operation 430, the deciding of operation 440, and the replacing of operation 450 may be realized using the method 200 illustrated in FIG. 2.

As the foregoing illustrates, an adaptive echo canceller consistent with the described embodiment(s) of the present invention achieves a high degree of echo cancellation, which is determined by the peak echo-to-noise ratio rather then its long-term average. Further, such an echo canceller is robust, maintaining the high performance (low Er) even when the conditions of the echo canceller updating are poor because of lower reference level, or higher local noise plus signal level. Moreover, the algorithm yields desired results under all circumstances. It results in convergence even during double talk if there is a brief silence on the local side and activity on the far side. Consequently, there is no need for double talk detection. The estimation of infoVeX is accurate enough that the present invention will detect the change of EPF before the change becomes audible (unless the change is abrupt and excessive) and initiate re-convergence. The re-convergence always uses the current state as the starting point. Thus, there is no need to clear the state variables of the echo canceller during normal operation.

Another advantageous aspect of the present invention is that the invented algorithm remains stable at any update rate so the update may take place as frequently as the capacity of the processor allows or as required.

Embodiments of the present invention include a computer usable/readable storage medium having computer readable program code embodied therein for signal adaptive filtering, including but not limited to, storage media such as magnetic storage media (e.g., ROM's, RAMs, floppy disks, hard disks, etc.), and optically readable media (e.g., CD-ROMs, DVDs, etc.).

Examples of various features/aspects/components/operations have been provided to facilitate understanding of the disclosed embodiments of the present invention. In addition, various preferences have been discussed to facilitate understanding of the disclosed embodiments of the present invention. It is to be understood that all examples and preferences disclosed herein are intended to be non-limiting.

Although selected embodiments of the present invention have been shown and described individually, it is to be understood that at least aspects of the described embodiments may be variously combined.

Although selected embodiments of the present invention have been shown and described, it is to be understood the present invention is not limited to the described embodiments. Instead, it is to be appreciated that changes may be made to these embodiments without departing from the principles and spirit of the invention, the scope of which is defined by the claims and the equivalents thereof.

What is claimed is:

1. A method of updating the adaptive filter of an echo canceller in which an estimated echo is resolved from a received signal and then subtracted from an incoming echo-contaminated signal so as to produce a filtered output signal, comprising:

obtaining a corrected impulse response (hc) of an echo reconstruction filter (ERF) by calculating a record of an estimated echo (Ee) from the ERF using a current ERF impulse response he and a record of a reference signal X, resolving an estimate of the local signal plus noise $Ve_n$ by subtracting the estimated echo Ee from a record of an input signal $Y_n$, estimating a residual frequency response Hr with a record of Ve and X using spectral estimates of $S_X$ and $S_{Ve,X}$, and computing the corrected ERF impulse response (hc) based on the spectral estimates using the following equation:

$$hc = he + IFFT\left(\frac{\hat{S}_{Ve,X}}{\hat{S}_X}\right);$$

calculating specified decision measures usable to decide whether to prospectively apply the corrected ERF impulse response hc or a current ERF impulse response he to a reference signal (X), the decision measures being
(i) a mutual information rate (infoVeX) of an estimate of the signal plus noise (Ve) and the reference signal (X),
(ii) an estimated echo return loss enhancement (ERLEi) of the echo canceller, and
(iii) a corrected echo return loss enhancement (ERLEc) of the echo canceller;

determining whether application of the corrected ERF impulse response hc would result in improved echo cancellation by
(i) comparing a mutual information rate of infoVeX to a specified threshold, and
(ii) comparing the ERLEc to the ERLEi; and updating the ERF to apply the corrected impulse response hc, when it is determined that the updating would result in a lower residual echo (Er).

2. The method of claim 1, wherein, when infoVeX is not greater than the threshold and ERLEc is greater than ERLEi, the ERF is updated with the corrected ERF impulse response hc.

3. The method of claim 1, wherein, when infoVeX is greater than the threshold, the ERLEe is set to the ERLEi, and if ERLEc is greater than ERLEi the ERF is updated with the corrected ERF impulse response hc.

4. The method of claim 1, further comprising saving the ERLEc for future updates, when the ERF is updated.

5. The method of claim 1, wherein the ERLEi is based on a currently active ERF impulse response, and the ERLEc is based on results that would have occurred if the corrected ERF impulse response had been applied.

6. The method of claim 1, wherein, in the determining, a record of past observations of the echo canceller is used and an actual output of the echo canceller is not used.

7. The method of claim 1, wherein, in the calculating a record of the estimated echo Ee, a fast convolution algorithm is used and single segment or multiple segments are used.

8. The method of claim 7, wherein, the convergence rate and the depth of the final echo cancellation depend on selected ones of a segment length, an overlapping ratio, and a window (tapering) function.

9. The method of claim 8, wherein the segment length is 8/3 L, L is the tail length of the ERF in samples, the overlapping ratio is a 50% overlapping ratio, and the window function is a Hann window function.

10. A method of updating an echo reconstruction filter (ERF) having changeable coefficients, comprising:

calculating a corrected impulse response (hc) of an echo reconstruction filter (ERF) by calculating a record of an estimated echo (Ee) from the ERF using a current ERF impulse response he and a record of a reference signal X, resolving an estimate of the local signal plus noise $Ve_n$ by subtracting the estimated echo Ee from a record of an input signal $Y_n$, estimating a residual frequency response Hr with a record of Ve and X using spectral estimates of $S_X$ and $S_{Ve,X}$, and computing the corrected ERF impulse response (hc) based on the spectral estimates using the following equation:

$$hc = he + IFFT\left(\frac{\hat{S}_{Ve,X}}{\hat{S}_X}\right);$$

calculating specified decision measures usable to decide whether to apply a current ERF or an updated ERF to echo-contaminated signals in the future;

deciding, based on the calculated decision measures, whether the hc would have yielded a lower residual echo (Er) than the current impulse response of the ERF (he) when applied to past observations; and replacing the coefficients of the ERF so that an impulse response of the ERF (he) equals hc.

11. A method of updating the adaptive filter of an echo canceller in which an estimated echo is resolved from a received signal and then subtracted from an incoming echo-contaminated signal so as to produce a filtered output signal, comprising:

obtaining a corrected impulse response (hc) of an echo reconstruction filter (ERF);

calculating specified decision measures usable to decide whether to prospectively apply the corrected ERF impulse response hc or a current ERF impulse response he to the reference signal;

determining whether application of the corrected ERF impulse response hc would result in improved echo cancellation; and updating the ERF to apply the corrected impulse response hc, when it is determined that the updating would result in a lower residual echo (Er), wherein the obtaining includes calculating a record of an estimated echo (Ee) from the ERF using a current ERF impulse response he and a record of a reference signal X, resolving an estimate of the local signal plus noise $Ve_n$ by subtracting the estimated echo Ee from a record of an input signal $Y_n$, estimating a residual frequency response Hr with a record of Ve and X using spectral estimates of $S_X$ and $S_{Ve,X}$, and computing the corrected ERF impulse response (hc) based on the spectral estimates using the following equation:

$$hc = he + IFFT\left(\frac{\hat{S}_{Ve,X}}{\hat{S}_X}\right).$$

* * * * *